(12) United States Patent
Clauberg et al.

(10) Patent No.: US 10,548,189 B2
(45) Date of Patent: Jan. 28, 2020

(54) CONTROL OF ISOLATED AUXILIARY POWER SUPPLY AND DALI SUPPLY FOR SENSOR-READY LED DRIVERS

(71) Applicant: SIGNIFY HOLDING B.V., Eindhoven (NL)

(72) Inventors: Bernd Clauberg, Schaumburg, IL (US); Sanbao Zheng, Hoffman Estates, IL (US); Johannes Adrianus Cornelis Misdom, Weert (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/326,248

(22) PCT Filed: Aug. 23, 2017

(86) PCT No.: PCT/EP2017/071199
§ 371 (c)(1),
(2) Date: Feb. 18, 2019

(87) PCT Pub. No.: WO2018/041687
PCT Pub. Date: Mar. 8, 2018

(65) Prior Publication Data
US 2019/0215920 A1    Jul. 11, 2019

Related U.S. Application Data

(60) Provisional application No. 62/380,678, filed on Aug. 29, 2016.

(30) Foreign Application Priority Data

Sep. 16, 2016 (EP) .................................. 16189130

(51) Int. Cl.
H05B 33/08 (2006.01)
H05B 37/02 (2006.01)
H02M 3/335 (2006.01)

(52) U.S. Cl.
CPC .... H05B 33/0815 (2013.01); H02M 3/33576 (2013.01); H05B 37/0254 (2013.01)

(58) Field of Classification Search
CPC .......... H05B 33/0815; H05B 37/0254; H02M 3/33576
(Continued)

(56) References Cited

U.S. PATENT DOCUMENTS

2010/0244726 A1* 9/2010 Melanson ......... H02M 3/33523
315/291
2010/0264838 A1 10/2010 Sutardja
(Continued)

FOREIGN PATENT DOCUMENTS

EP       2533612 A1    12/2012
WO   2012085836 A2     6/2012

Primary Examiner — Don P Le
(74) Attorney, Agent, or Firm — Daniel J. Piotrowski

(57) ABSTRACT

A lighting driver (300, 400) for driving at least one lighting device (120) includes a control unit (310, 410) disposed on a first side of an electrical isolation barrier (320, 420), and a power supply unit (350, 450) disposed on a second side of the electrical isolation barrier so as to be electrically isolated from the control unit. The control unit supplies a single enable signal (302, 402) across the electrical isolation barrier to the power supply unit. The power supply unit includes a switching circuit (S1/S2) configured to selectively enable and disable, in response to the single enable signal, two output voltages for supplying power to an external device (130) which communicates data with the lighting driver.

11 Claims, 4 Drawing Sheets

(58) Field of Classification Search
USPC .......................................................... 315/307
See application file for complete search history.

(56) References Cited

U.S. PATENT DOCUMENTS

| | | | | |
|---|---|---|---|---|
| 2012/0280637 A1* | 11/2012 | Tikkanen | ........... | H05B 33/0803 |
| | | | | 315/294 |
| 2013/0193849 A1 | 8/2013 | Zimmermann et al. | | |
| 2013/0320883 A1* | 12/2013 | Zheng | ................ | H05B 33/0815 |
| | | | | 315/307 |
| 2014/0195065 A1 | 7/2014 | Yang | | |
| 2014/0252955 A1* | 9/2014 | Gunda | ................ | H05B 33/0803 |
| | | | | 315/119 |
| 2014/0265916 A1* | 9/2014 | Melanson | .......... | H05B 33/0809 |
| | | | | 315/291 |
| 2015/0008844 A1* | 1/2015 | Wilson | ...................... | H02J 9/02 |
| | | | | 315/291 |
| 2015/0123575 A1 | 5/2015 | Hoffknecht et al. | | |

\* cited by examiner

CONTROL OF ISOLATED AUXILIARY POWER SUPPLY AND DALI SUPPLY FOR SENSOR-READY LED DRIVERS

CROSS-REFERENCE TO PRIOR APPLICATIONS

This application is the U.S. National Phase application under 35 U.S.C. § 371 of International Application No. PCT/EP2017/071199, filed on Aug. 23, 2017 which claims the benefit of U.S. Provisional Patent Application No. 62/380,678, filed on Aug. 29, 2016 which claims the benefit of European Patent Application No. 16189130.4, filed Sep. 16, 2016. These applications are hereby incorporated by reference herein.

TECHNICAL FIELD

The present invention is directed generally to lighting drivers for lighting units. More particularly, various inventive methods and apparatus disclosed herein relate to a method and system for controlling the supply of power from a sensor-ready light emitting diode (LED) driver to an external device such as a sensor or a lighting control unit, such as an outdoor lighting controller.

BACKGROUND

Recently so-called smart lighting drivers are used in connected light emitting diode (LED) lighting systems. Such smart drivers are often called Sensor Ready (SR) because they include a self-powered DALI interface. This self-powered DALI interface, namely an SR interface, may be used to communicate with, and supply power to, an external device such as a wireless sensor or Outdoor Lighting Controller (OLC). The smart driver communicates to the lighting network through SR interface and the external device which connected to it.

In some connected systems, a simple wireless sensor can be fully powered by the SR bus. However, for more complicated control units such as an OLC, usually higher power or DC voltage different from the SR bus voltage is required. In that case an auxiliary low voltage power supply is also provided by the smart driver to meet this requirement.

The SR bus is connected to devices using the DALI protocol for communicating, i.e. the SR bus is pulled low periodically during the transmission of a DALI command. When the SR bus is pulled low it is equivalent to short-circuiting the SR bus. To limit this short-circuit current, a current limiter from the SR supply to the SR bus is needed. Furthermore, for different applications or different working conditions in a particular application, the SR supply and auxiliary power supply, which are located on the low voltage secondary side of the lighting driver need the capability of being enabled or disabled by a main controller in the lighting driver, which is usually on the high voltage primary side since most of the controls are located there.

Thus, it would be desirable to provide a lighting driver and associated method of operating a lighting driver which may communicate power or voltage enabling and disabling commands from a control unit on the "primary side" to both a DALI supply and auxiliary power supply on the "secondary side" of a sensor ready LED driver in a simplified manner.

SUMMARY

The present disclosure is directed to inventive methods and apparatus for a lighting driver which may communicate power or voltage enabling and disabling commands from a control unit on the "primary side" to both a DALI supply and auxiliary power supply on the "secondary side" of a sensor ready LED driver, and which provides current-limiting from the DALI supply to the DALI bus.

Generally, in one aspect, a lighting driver is provided for driving at least one lighting device. The lighting driver comprises: a control unit disposed on a first side of an electrical isolation barrier; a transformer for supplying power to the at least one lighting device and comprising an auxiliary winding for supplying power to a second side of the isolation barrier; and a power supply unit disposed on a second side of the electrical isolation barrier so as to be electrically isolated from the control unit, the control unit supplying a single enable signal across the electrical isolation barrier to the power supply unit, wherein the power supply unit includes a switching circuit configured to selectively enable and disable, in response to the single enable signal, two output voltages for supplying power to an external device which communicates data with the lighting driver.

In some embodiments, the control unit is configured to supply the single enable signal having a selected one of at least three states, and the power supply unit is configured to switch the two output voltages such that one, both, or none of the two output voltages is supplied to the external device depending on the selected one of the at least three states.

In some versions of these embodiments, the at least three states of the single enable signal include a steady high voltage level, a steady low voltage level, and a pulse-width-modulated (PWM) signal, and the power supply unit is configured to switch the two output voltages such that one, none, or both of the two output voltages are supplied to the external device depending on whether the single enable signal has the steady low voltage level, has the steady high voltage level, or is the PWM signal.

In some versions of these embodiments, the first output voltage is an auxiliary voltage, the second output voltage is a Digital Addressable Lighting Interface (DALI) voltage, which is less than the auxiliary voltage, for a DALI bus, and the power supply unit includes a DALI supply voltage circuit which is configured to produce and regulate the DALI supply voltage from the auxiliary voltage, and wherein the lighting driver includes a DALI interface for communicating with the external device via the DALI bus.

In some versions of these embodiments, a return connection for the auxiliary voltage and a negative terminal of the DALI supply voltage share a common line connected to the external device, and the power supply unit further includes a high side current limiter connected to a positive terminal of the DALI supply voltage and which is configured to limit a current drawn by the DALI bus from the DALI supply voltage.

In some versions of these embodiments, the switching circuit includes a first switch and a second switch, wherein the first switch is connected between the auxiliary voltage and the positive voltage side of the DALI bus, wherein the second switch is connected in series with the common line connected to the external device, and the power supply unit further comprises: a filter configured to supply a control signal to a control terminal of the second switch in response to the single select signal to turn on the second switch and supply the auxiliary voltage to the external device when the single enable signal has the steady low voltage level and when the single enable signal is the PWM signal, and to turn off the second switch and disable supply of the auxiliary voltage and the DALI supply voltage to the external device when the single enable signal has the steady high voltage level; a detector configured to detect whether the single enable signal is the PWM signal; and a voltage doubler which doubles a peak voltage of the PWM signal and supplies the doubled peak voltage to a control terminal of the first switch to turn on the first switch and supply the DALI supply voltage to the external device when the single enable signal is the PWM signal, and to turn off the first switch and disable supply of the DALI supply voltage to the external device when the single enable signal has the steady low voltage level.

In some versions of these embodiments, the external device is an outdoor lighting controller which communicates wirelessly with a lighting network, wherein the lighting driver is configured to supply the auxiliary voltage and the DALI supply voltage to the outdoor lighting controller to power the outdoor lighting controller, and wherein the lighting driver is configured to communicate the data with the outdoor lighting controller over the DALI bus via the DALI interface.

In some versions of these embodiments: none of the two output voltages is enabled to be supplied to the external device in response to the single enable signal having a first of the at least three states, a first one of the two output voltages is enabled to be supplied to the external device and a second one of the two output voltages is disabled and not supplied to the external device in response to the single enable signal having a second of the at least three states, and both of the two output voltages are enabled and supplied to the external device in response to the single enable signal having a third of the at least three states.

In another aspect of the invention, a method comprises: supplying a single enable signal and an auxiliary power supply from a control unit disposed on a first side of an electrical isolation barrier of a lighting driver, to a power supply unit disposed on a second side of the electrical isolation barrier so as to be electrically isolated from the control unit; and the power supply unit selectively enabling and disabling, in response to the single enable signal and to the auxiliary power supply, two output voltages for supplying power to an external device which communicates data with the lighting driver.

In some embodiments, the method further comprises: the control unit selecting one of at least three states, and supplying the single enable signal having the selected state; and switching the two output voltages such that one, both, or none of the two output voltages is supplied to the external device depending on the selected state.

In some versions of these embodiments, the at least three states of the single enable signal include a steady high voltage level, a steady low voltage level, and a pulse-width-modulated (PWM) signal, the method further comprising switching the two output voltages such that one, none, or both of the two output voltages are supplied to the external device depending on whether the single enable signal has the steady low voltage level, has the steady high voltage level, or is the PWM signal.

In some versions of these embodiments, the first output voltage is an auxiliary voltage, wherein the second output voltage is a Digital Addressable Lighting Interface (DALI) voltage, which is less than the auxiliary voltage, for a DALI bus, the method further comprising: producing and regulating the DALI supply voltage from the auxiliary voltage; and communicating with the external device via the DALI bus.

In some versions of these embodiments, the method further comprises: a return connection for the auxiliary voltage and a negative terminal the DALI supply voltage sharing a common line connected to the external device; and limiting a current drawn by the DALI bus from the DALI supply voltage by a high side current limiter connected to a positive terminal of the DALI supply voltage.

In some versions of these embodiments, the method of claim 13 further comprises: supplying the auxiliary voltage to the external device when the single enable signal has the steady low voltage level and when the single enable signal is the PWM signal; disabling supply of the auxiliary voltage and the DALI supply voltage to the external device when the single enable signal has the steady low voltage level; supplying the DALI supply voltage to the external device when the single enable signal is the PWM signal; and disabling supply of the DALI supply voltage to the external device when the single enable signal has the steady low voltage level.

In some versions of these embodiments, the external device is an outdoor lighting controller which communicates wirelessly with a lighting network, the method including: supplying the auxiliary voltage and the DALI supply voltage to the outdoor lighting controller to power the outdoor lighting controller; and the lighting driver communicating the data with the outdoor lighting controller via a DALI interface.

In some versions of these embodiments, the method further comprises: disabling supply of both of the two output voltages to the external device in response to the single enable signal having a first of the at least three states; enabling a first one of the two output voltages to be supplied to the external device and disabling a second one of the two output voltages inhibiting supply of the second one of the two output voltages to the external device in response to the single enable signal having a second of the at least three states; and enabling both of the two output voltages to be supplied to the external device in response to the single enable signal having a third of the at least three states.

In yet another aspect of the invention, a driver for a lighting device comprises: a control part; and an electrically isolated interface for connecting the control part with at least one sensor, wherein the electrically isolated interface comprises a supplying circuit configured to transform an input voltage received from the control part from one voltage into at least two voltages for supply to the sensor.

In some embodiments, the control part switches supply of the at least two voltages to the remote device through an electrically isolated signal path of the electrically isolated interface.

In some versions of these embodiments, the control part switches supply of the at least two voltages independently to the remote device in response to the one voltage received from the control part.

In some versions of these embodiments, the control part is configured to control the one voltage to be one of a steady high voltage, a steady low voltage, and a pulse-width-modulated (PWM) voltage, and the electrically isolated interface is configured to switch independently the two voltages such that one, both, or none of the two voltages are supplied to the sensor depending on whether the one voltage is the steady high voltage, the steady low voltage, or the PWM voltage.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED light sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radio luminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED lighting unit" refers to a lighting unit that includes one or more LED light sources as discussed above, alone or in combination with other non LED light sources.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, EEPROM and FLASH memory, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
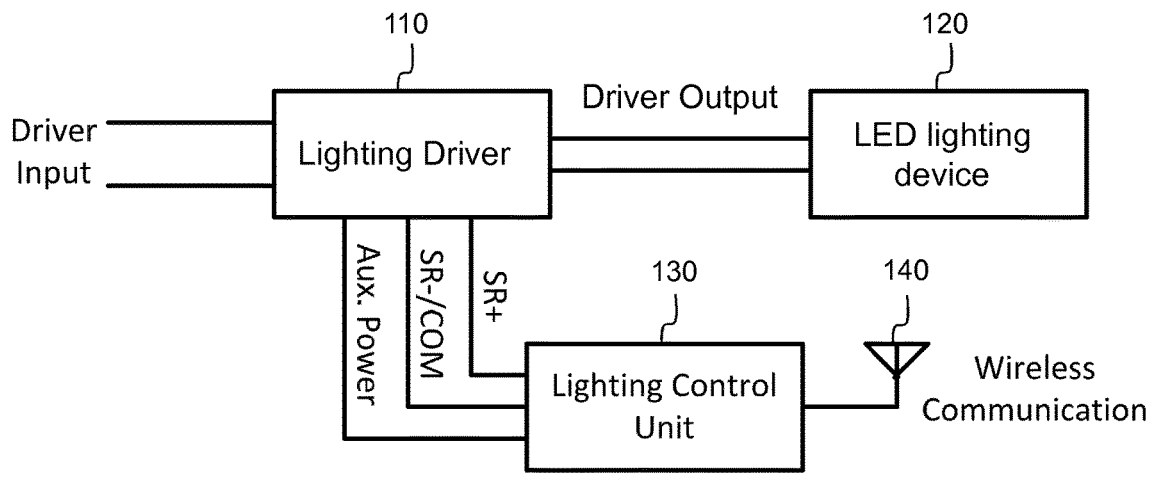
FIG. 1 illustrates a high level block diagram of this connected lighting system.

FIG. 1 illustrates a high level block diagram of this connected lighting system 100. Lighting system 100 includes lighting driver 110, lighting unit 120, a lighting control unit 130 and a wireless communication transceiver and antenna 140.

Here, lighting driver 100 may be connected to receive electrical power from a power source, such as AC Mains power, and may configure and format the power for driving lighting unit 120, which may be a light emitting diode (LED) lighting unit. Lighting control unit 130 may communicate with lighting driver 110 via a Digital Addressable Lighting Interface (DALI) bus with a built-in supply, herein referred to as a Sensor Ready (SR) interface. Lighting control unit 130 may receive its electrical power from lighting driver 110 as an auxiliary voltage and a SR voltage supporting the DALI bus by means of which lighting control unit 130 may communicate with lighting driver 110. In that case, lighting driver 110 may be a Sensor Ready (SR) LED lighting driver.

In some embodiments, lighting control unit 130 may be an outdoor lighting controller (OLC) which may communicate with other controllers and devices in a lighting network via wireless communication transceiver and antenna 140. For example, in some embodiments lighting control unit 130 may be part of a streetlight system or outdoor lighting network and may wirelessly communicate with sensors, other lighting control units and/or a master control terminal to ascertain information for controlling illumination of lighting unit 120 by lighting driver 110. In some embodiments, lighting control unit 130 may include one or more sensors, such as ambient light sensors. In some embodiments, lighting control unit 130 may produce data representing one or more sensor signals and/or one or more control signals which it communicates to lighting driver 110 via the DALI bus. Similarly, lighting driver 110 may communicate data to lighting control unit 130 via the DALI bus. That is, in general lighting control unit 130 may communicate data with lighting driver 110 via the DALI bus, which as used herein is intended to mean that data is sent from lighting driver 110 to lighting control unit 130, or data is sent from lighting control unit 130 to lighting driver 110, or both. In this manner, lighting driver 110 may communicate with the lighting network through the SR interface and lighting control unit 130 connected to it.

Figure 2:
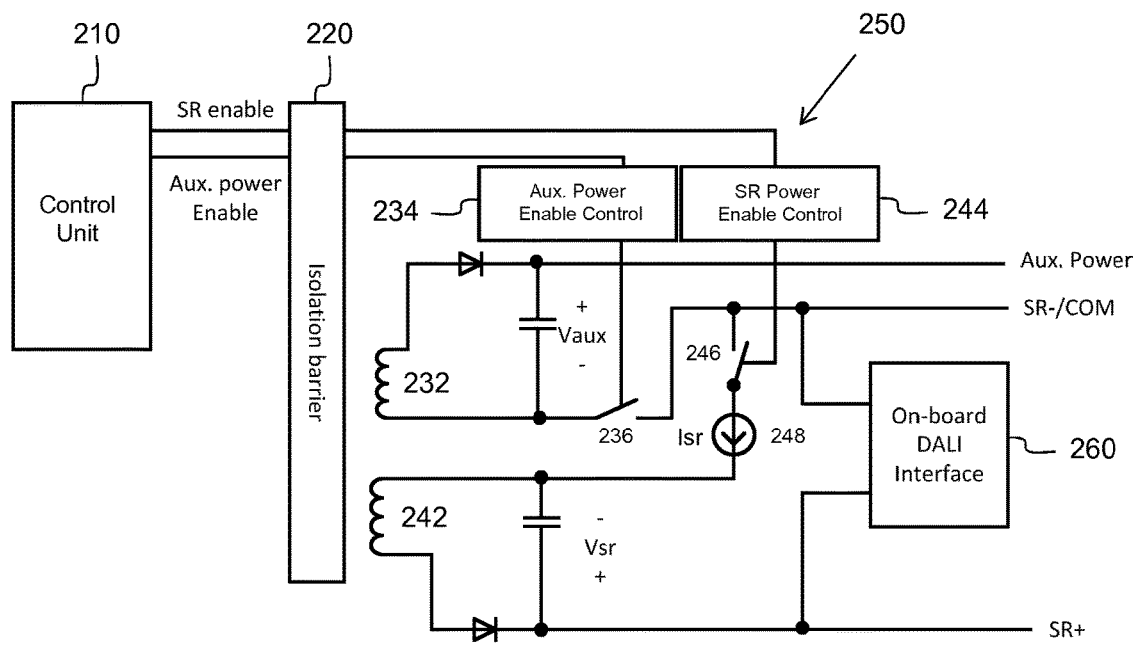
FIG. 2 illustrates a functional block diagram of an example of a sensor-ready light emitting diode (LED) lighting driver.

FIG. 2 illustrates a functional block diagram of an example of a sensor-ready (SR) light emitting diode (LED) lighting driver 200 which may be one embodiment of lighting driver 110.

Lighting driver 200 includes a control unit 210 and a power supply unit 250, electrically isolated from each other by an isolation barrier 220. Control unit 210 is on a "primary side" or high voltage side of isolation barrier 220 where, in some embodiments, lighting driver 200 may receive input power from AC Mains. Power supply unit 250 is on a "secondary side" or low voltage side of isolation barrier 220 and may supply an auxiliary voltage and an SR (i.e., DALI) voltage to an external device (e.g., a lighting control unit) in response to an SR enable signal and an auxiliary power enable signal which are communicated across isolation barrier 220. Toward this end, power supply unit 250 includes a first transformer winding 232, an auxiliary power enable control 234, a first switch 236, a second transformer winding 242, an SR (i.e., DALI) power enable control 244, a second switch 246, and a current limiter 248. Lighting driver 200 also includes a DALI interface 260. Lighting driver 200 may include other elements not shown in FIG. 2, in particular elements for supplying power to a lighting unit, in particular an LED lighting unit, which may include, in various embodiments, a power transformer, a buck converter, a boost converter, a buck-boost converter, a PWM modulator, etc.

Lighting driver 200 provides the SR voltage Vsr from a dedicated low voltage power supply obtained from transformer winding 242 of an on-board low voltage supply such as a flyback converter, and is selectively disabled or enabled to be supplied by power supply unit 250 to an external device (e.g., a lighting control unit) by switch 246 in response to an SR enable signal received from control unit 210 across isolation barrier 220. The auxiliary supply voltage Vaux is obtained from a separate winding 232 of the same transformer or from an independent converter, and is selectively disabled or enabled to be supplied by power supply unit 250 to an external device (e.g., a lighting control unit) by switch 236 in response to an auxiliary power enable signal received from control unit 210 across isolation barrier 220. In some embodiments, the external device may have no other source of power than that which is provided to it by power supply unit 250.

In turn, the SR bus may be connected to the external device (and optionally one or more other external devices) by means of which the external device may communicate data with lighting driver 200 using the DALI protocol for communicating, i.e. the SR bus is pulled low periodically during the transmission of a DALI command. When the SR bus is pulled low it is equivalent to short-circuiting the SR bus. To limit this short-circuit current, current limiter 248 is provided, connected from the negative terminal or low side of SR− of the SR supply voltage to the SR bus. For different applications or different working conditions in a particular application, the SR supply and auxiliary power supply need the capability of being enabled or disabled by control unit 210, which is on the high voltage primary side of isolation barrier 220 since most of the controls are located there. In lighting driver 200, these enabling and disabling commands are transferred to the low voltage secondary side by two independent signals or channels. Because current limiter 248 is the negative terminal or low side SR− of the SR supply voltage, both current limiter 249 and enabling switch 246 for the SR bus can be controlled directly from the SR supply voltage.

However, the arrangement illustrated in FIG. 2 has some drawbacks. One drawback is the complexity and high cost of transmitting multiple control signals (i.e., the SR enable signal and the auxiliary power enable signal) from the primary side to the low voltage secondary side across isolation barrier 220. In some embodiments, this may involve the use of two optocouplers for isolation barrier 220. Another drawback is the complexity and high cost of using different voltage supplies for the low voltage auxiliary power and the SR supply voltage (e.g., more complicated and/or additional transformer windings). Another drawback is that there is often insufficient drive voltage from the SR enable signal for SR current limiter control.

More generally, the inventors have recognized and appreciated that it would be beneficial to provide a lighting driver and associated method of operating a lighting driver which may communicate power or voltage enabling and disabling commands from a control unit on the "primary side" to both a DALI supply and auxiliary power supply on the "secondary side" of a sensor ready LED driver in a simplified manner. More specifically, the inventors have recognized that there is a need in the art for a lighting driver and associated method of operating a lighting driver which may communicate power or voltage enabling and disabling commands from a control unit on the "primary side" to a DALI supply and auxiliary power supply on the "secondary side" of a sensor ready LED driver using a single isolated signal path.

In view of the foregoing, various embodiments and implementations of the present invention are directed to inventive methods and apparatuses for a lighting driver which may communicate power or voltage enabling and disabling commands from a control unit on the "primary side" to a DALI supply and auxiliary power supply on the "secondary side" of a sensor ready LED driver via a single enable signal using a single isolated signal path.

Figure 3:
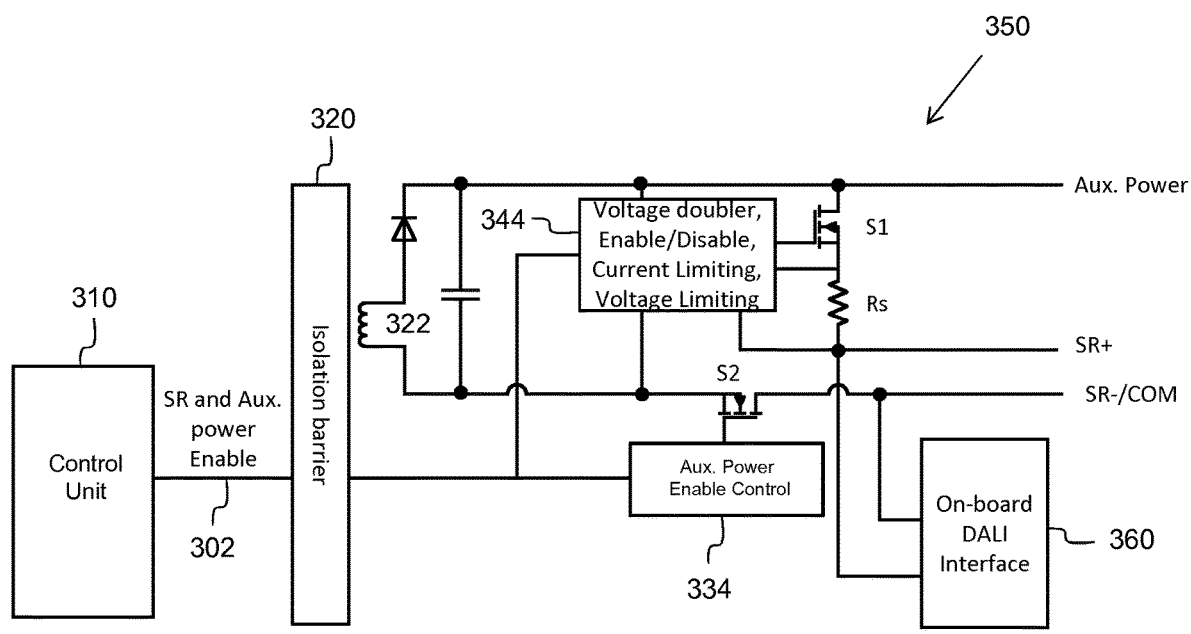
FIG. 3 illustrates a functional block diagram of an example embodiment of a sensor-ready light emitting diode (LED) lighting driver which may communicate power or voltage enabling and disabling commands from the "primary side" to the "secondary side" of the lighting driver using a single isolated signal path.

FIG. 3 illustrates a functional block diagram of an example embodiment of a sensor-ready light emitting diode (LED) lighting driver 300 which may communicate power or voltage enabling and disabling commands from the "primary side" to the "secondary side" of lighting driver 300 via a single enable signal 302 using a single isolated signal path. Here, it should be understood that a "single enable signal" means exactly one enable signal to the exclusion of additional enable signals, and a "single isolated signal path" means exactly one isolated signal path to the exclusion of additional enable signal isolated signal paths.

Lighting driver 300 includes a control unit 310 and a power supply unit 350, electrically isolated from each other by an isolation barrier 320. Control unit 310 is on a "primary side" or high voltage side of isolation barrier 320 where, in some embodiments, lighting driver 300 may receive input power from AC Mains. Power supply unit 350 is on a "secondary side" or low voltage side of isolation barrier 320 and may supply both an auxiliary voltage and an SR (i.e., DALI) voltage to an external device (e.g., a lighting control unit, such as an outdoor lighting controller) in response to single enable signal 302 (here, referred to as "SR and Auxiliary Power enable signal) communicated across isolation barrier 320. Toward this end, power supply unit 350 includes a first transformer winding 332, an auxiliary power enable control 334, a voltage doubler—enable/disable control—current limiter—voltage limiter circuit 344, and a first switch S1 and second switch S2. Lighting driver 300 also includes a DALI interface 360. Lighting driver 300 may include other elements not shown in FIG. 3, in particular elements for supplying power to a lighting unit, in particular an LED lighting unit, which may include, in various embodiments, a power transformer, a buck converter, a boost converter, a buck-boost converter, a PWM modulator, etc.

Lighting driver 300 produces the auxiliary voltage (e.g., 24 VDC) from winding 322, which may be a separate winding of a transformer which may be used by lighting driver 300 to supply the power to illuminate one or more lighting devices (e.g., LEDs) of a lighting unit (e.g., lighting unit 120) which is driven by lighting driver 300, or from an independent converter in lighting driver 300. The auxiliary voltage is enabled to be supplied by power supply unit 350 to an external device (e.g., a lighting control unit) in response to the single enable signal 302 received from control unit 310 across isolation barrier 320 by operation of second switch S2.

In lighting driver 300, the auxiliary power supply shares the same supply with the SR voltage. In particular, lighting driver 300 produces the SR voltage from the auxiliary voltage, and is enabled to be supplied by power supply unit 350 to an external device (e.g., a lighting control unit) in response to an SR enable signal received from control unit 210 across isolation barrier 220. The SR voltage is enabled to be supplied by power supply unit 350 to an external device (e.g., a lighting control unit) in response to the single enable signal 302 received from control unit 310 across isolation barrier 320 by a combination of the operations of first switch S1 and second switch S2, as will be explained in greater detail below. In some embodiments, the external device may have no other source of power than that which is provided to it by power supply unit 350.

The SR bus may be connected to the external device (and optionally one or more other external devices) by means of which the external device may communicate data with lighting driver 300 using the DALI protocol for communicating, i.e. the SR bus is pulled low periodically during the transmission of a DALI command. As noted above, when the SR bus is pulled low it is equivalent to short-circuiting the SR bus. To limit this short-circuit current, circuit 344 includes a current limiter, connected from the positive terminal or high side SR+ of the SR supply voltage to the SR bus. Here, Rs is a current sensing resistor that provides current feedback to the gate control circuit of S1 via circuit 344. S1 and the current limiter are on the high side or positive terminal of the SR supply voltage so the negative terminal side SR− of the SR supply voltage and the return connection (COM) to lighting driver 300 from the external device for the auxiliary voltage and a share a common lead or line connected to the external device.

In one embodiment, control unit 310 is configured to supply the single enable signal 302 having a selected one of at least three states, and power supply unit 350 is configured to switch the two output voltages (the auxiliary voltage and the SR supply voltage) such that one, both, or none of the two output voltages is supplied to the external device depending on which one of the at least three states is selected.

In a specific embodiment, the at least three states of the single enable signal include a steady high voltage level, a steady low voltage level, and a pulse-width-modulated (PWM) signal, and power supply unit 350 is configured to switch the two output voltages (the auxiliary voltage and the SR supply voltage) such that one, none, or both of the two output voltages are supplied to the external device depending on whether the single enable signal has the steady low voltage level, has the steady high voltage level, or is a PWM signal.

Figure 4:
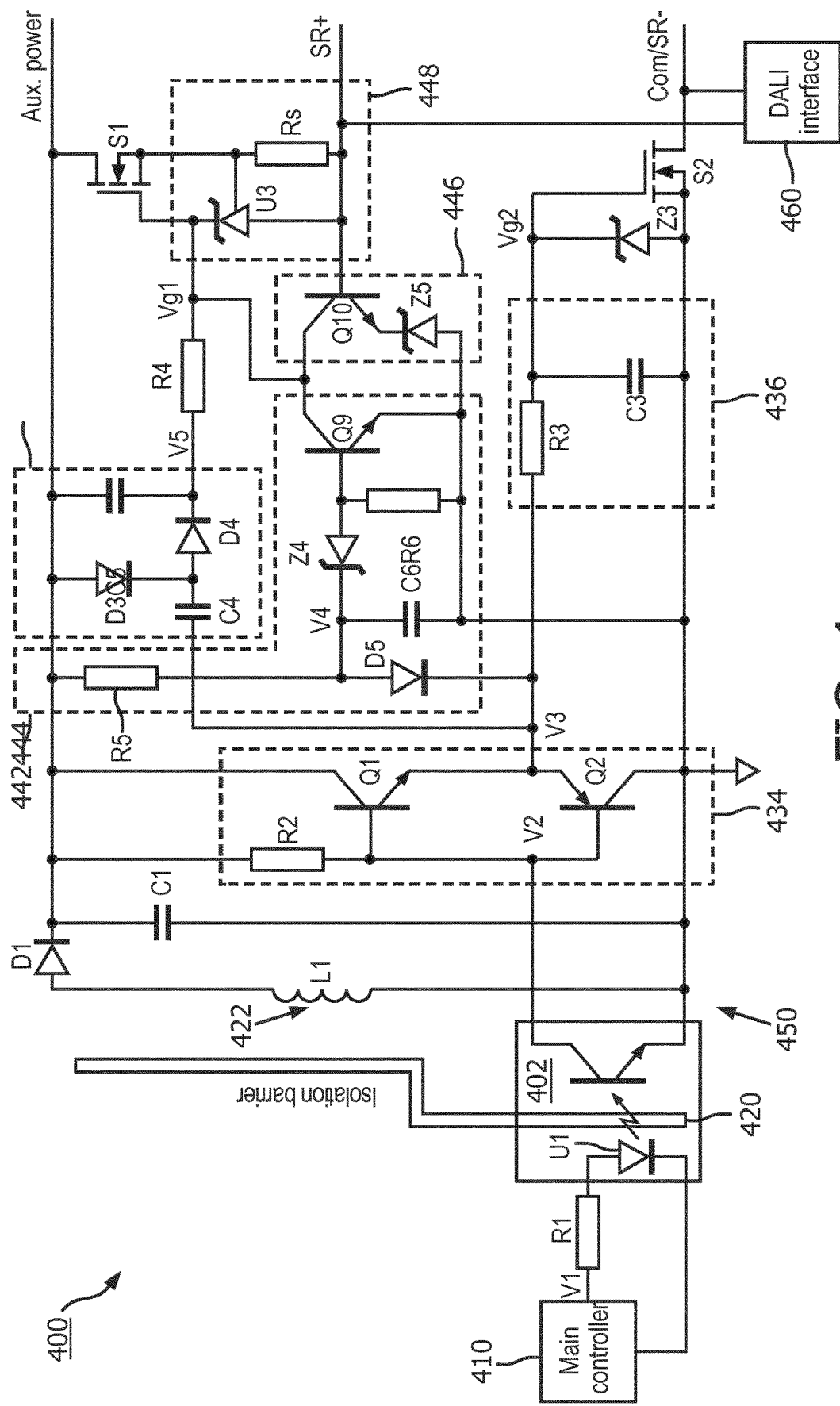
FIG. 4 shows a schematic diagram of an example embodiment of a sensor-ready LED lighting driver which may communicate power or voltage enabling and disabling commands from the "primary side" to the "secondary side" of the lighting driver using a single isolated signal path.

Further details of such embodiments will be described below with respect to FIG. 4, shows a schematic diagram of an example embodiment of a sensor-ready LED lighting driver 400 which may be one embodiment of lighting driver 300. As described in more detail below, lighting driver 400 may communicate power or voltage enabling and disabling commands from the "primary side" to the "secondary side" of lighting driver 400 using a single isolated signal path via a single enable signal.

Lighting driver 400 includes a control unit 410 and a power supply unit 450, electrically isolated from each other by an isolation barrier 420 provided by an optocoupler U1. Control unit 410 is on a "primary side" or high voltage side of isolation barrier 420 where, in some embodiments, lighting driver 400 may receive input power from AC Mains. Power supply unit 450 is on a "secondary side" or low voltage side of isolation barrier 420 and may supply both an auxiliary voltage and an SR (i.e., DALI) voltage to an external device (e.g., a lighting control unit, such as an outdoor lighting controller) in response to single enable signal 402 (here, referred to as "SR and Auxiliary Power enable signal) communicated across isolation barrier 420 by means of optocoupler U1. Here, it is noted that the polarity of single enable signal 402, represented by voltage V1, is reversed or inverted on the secondary side of lighting driver as voltage V2 by operation of optocoupler U1. Toward this end, power supply unit 450 includes a push-pull driver 434, a filter 436, a PWM signal detector 442, a voltage doubler 444, an SR supply voltage regulator 446, an SR supply voltage current limiter 448, first and second switches S1 and S2, and other components to be described below. Lighting driver 400 also includes a DALI interface 460. Lighting driver 400 may include other elements not shown in FIG. 4, in particular elements for supplying power to a lighting unit, in particular an LED lighting unit, which may include, in various embodiments, a power transformer, a buck converter, a boost converter, a buck-boost converter, a PWM modulator, etc.

In operation, control unit 410 generates single enable signal 402 which is selected to have one of at least three states or voltages, depending on how it is desired to enable or control the voltages (the auxiliary voltage and the SR supply voltage) to be disabled, or enabled to be output by power supply unit 450 and supplied to the external device for powering the external device. In some embodiments, the external device may have no other source of power than that which is provided to it by power supply unit 450. In particular, the at least three states of single enable signal 402 include a steady high voltage level, a steady low voltage level, and a pulse-width-modulated (PWM) signal. Power supply unit 450 is configured to switch the two output voltages (the auxiliary voltage and the SR supply voltage) such that one, none, or both of the two output voltages are supplied to the external device depending on whether the single enable signal has the steady low voltage level, the steady high voltage level, or the PWM signal. More specifically, when it is desired to disable both the auxiliary voltage and the SR supply voltage, then control unit 410 outputs single enable signal 402 (i.e., V1) to have a steady high voltage level. On the other hand, when it is desired to enable the auxiliary voltage and disable the SR supply voltage, then control unit 410 outputs single enable signal 402 (i.e., V1) to have a steady low voltage level. Finally, when it is desired to enable both the auxiliary voltage and the SR supply voltage, then control unit 410 outputs single enable signal 402 (i.e., V1) as a PWM signal.

U1 provides an isolation barrier from primary to secondary and outputs the voltage V2 having a reversed logic level with respect to the voltage V1 output by control unit 410. The output of U1 drives push-pull driver 434 comprising Q1, Q2 and R2, which boosts the driving capability, and outputs a push-pull output voltage V3 which maintains the same logic level as the voltage V2. Filter 436 comprising R3 and C3 receives the push-pull output voltage V3 as an input and filters out AC components in a case where the single enable signal 402 is a PWM signal. The output of filter 436 is a voltage Vg2 which is applied to the gate of the second switch S2 and thereby controls the ON/OFF switching operation of the second switch S2 for enabling the auxiliary voltage and power to be supplied to an external device. The gate driving voltage of the second switch S2 is clamped by Zener Z3.

In another branch, the push-pull output voltage V3 is used to feed voltage doubler 444 formed by C4, D3, D4, and C5. When the single enable signal 402 (V1) is a PWM signal, voltage doubler 444 is active and provides an output voltage V5 for driving the gate of the first switch S1. The voltage level of V5 is greater than the auxiliary output voltage Vaux and can be as high as 2*Vaux, depending on the circuit design (e.g., component value selections). The voltage V5 is used to drive the SR supply voltage current limiter 448, and enable first switch S1 through a gate resistor R4. With the voltage V5 being greater than Vaux, the voltage at the positive terminal (SR+) of the SR supply voltage (e.g., 20.5 V) can be regulated near Vaux (e.g., 24 V), and the voltage across the first switch S1 and Rs can be minimized. This not only provides sufficient SR supply voltage to meet DALI requirements, but also gives the benefit of minimizing power dissipation in the first switch S1. Voltage regulator 446 includes transistor Q10 and Zener diode Z5 and is used to regulate the SR supply voltage at the level of Vsr=V(Z5)+Vbe, where V(Z5) is the Zener voltage of Z5 and Vbe is the b-e junction voltage of Q10. This voltage feedback loop ensures that SR supply voltage Vsr falls within the specified DALI bus voltage range. U3 is a shunt voltage regulator that regulates the gate voltage Vg1 according to the voltage across Rs, which is proportional to the SR supply voltage output current. This forms a current feedback loop so that the SR supply voltage output current is regulated if the SR bus is shorted or connected to a load that causes the SR supply voltage to be less than the regulated voltage Vsr.

A third branch of the push-pull output voltage V3 is used to detect if the single enable signal 402 (V1) is a PWM signal or a pure dc signal (steady low voltage or steady high voltage). This detection is accomplished by PWM signal detector 442, comprising D5, R5, C6, Z4, R6, and Q9, which performs a negative-peak-detection on the push-pull output voltage V3. In particular, the three different states for single enable signal 402 (V1) generate different operating modes for Q9, as follows.

In a first state, single enable signal 402 (V1) has a steady high voltage (is constantly high), so the push-pull output voltage V3 is constantly low at V(be), where V(be) is the b-e junction voltage of Q2. The voltage V4 is also low at Vbe+Vfd, where Vfd is the forward voltage drop of the diode D5. The Zener voltage of Zener diode Z4 (V(Z4)) is selected to be greater than this low level of the voltage V4, and any possible leakage current through Z4 is bypassed by R6 so there is no base current to drive Q9. In this case Q9 is off or open.

In a second state, single enable signal 402 (V1) has a steady low voltage (is constantly low), so the push-pull output voltage V3 is constantly high at Vaux−Vbe, where Vaux is the auxiliary supply voltage and Vbe is the b-e junction voltage of Q1. In this case the voltage V4 can be charged up by R5 to be as high as Vaux−Vbe+Vfd, which is greater than Zener voltage V(Z4). In this case this high voltage V4 turns on Q9 and Q9 conducts current, which pulls Vg1 low and turns the first switch S1 off.

In a third state, single enable signal 402 (V1) is a PWM signal with a duty ratio of δ, so the push-pull output voltage V3 is a PWM signal with a duty ratio of 1−δ. In this case C6 fully discharges itself during the PWM low cycles of the push-pull output voltage V3. R5 is selected to have a large enough value so C5 can only be charged up to a voltage which is less than the Zener voltage V(Z4) during the high cycles of the PWM signal of the push-pull output voltage V3. Therefore, the voltage V4 is less than the Zener voltage V(Z4) and Q9 is off or open.

Based on the three operating modes described above, the enabling and disabling of SR supply voltage and the auxiliary voltage for each of the different states of single enable signal 402 (V1) will now be described.

In a first state, single enable signal 402 (V1) has a steady high voltage (is constantly high). In this state, the second switch S2 is off or disabled because the push-pull output voltage V3 is low. Thus, the auxiliary voltage is disabled and not provided by lighting driver 400 to an external device. The SR supply voltage is also disabled, and not provided by lighting driver 400 to an external device, even though S1 is enabled, because the positive terminal of the SR supply voltage is derived from the same auxiliary voltage which is disabled, and thus the second switch S2 is in this supply path in this case.

In a second state, single enable signal 402 (V1) has a steady low voltage (is constantly low). In this state, the second switch S2 is on or enabled because the push-pull output voltage V3 is high. Thus the auxiliary voltage is enabled and may be provided by lighting driver 400 to an external device. However, the first switch S1 is off or disabled because Q9 conducts current and is on, pulling Vg1 low, as explained above. Therefore the SR supply voltage is disabled and not provided by lighting driver 400 to an external device.

In a second state, single enable signal 402 (V1) is a PWM signal. In this case the gate voltage Vg2 for the second switch S2 is a DC voltage filtered from the push-pull output voltage V3 and equals the average voltage of the push-pull output voltage V3. This DC voltage is designed to be greater than the gate threshold voltage of the second switch S2, so the second switch S2 is turned on and thus auxiliary power supply is enabled and may be provided by lighting driver 400 to an external device. In this case, Q9 is off or open so the first switch S1 is also turned on by the voltage V5, output of voltage doubler 444. Therefore, with single enable signal 402 (V1) in the third state, the SR supply voltage is also enabled and may be provided by lighting driver 400 to an external device. A summary of the logic levels and enabling status are given in Table 1 below.

TABLE 1

| V1 | V2 | V3 | V4 | V5 | Vg1 | Vg2 | S1 | S2 | Aux. Voltage | SR Supply Voltage |
|---|---|---|---|---|---|---|---|---|---|---|
| High | Low | Low | Low | Vaux−2Vfd | High | Low | ON | OFF | Disabled | Disabled |
| Low | High | High | High | Vaux−2Vfd | Low | High | OFF | ON | Enabled | Disabled |
| PWM (Duty Cycle = δ) | 1−δ | 1−δ | Low | Vaux to 2Vaux | High | High | ON | ON | Enabled | Enabled |

From Table 1 it is clear that three of four possible enabling/disabling state combinations for the auxiliary voltage/power and the SR supply voltage/power are implemented with the single enable signal 402 using a single isolated signal path. The fourth combination, with the SR supply voltage/power enabled and auxiliary power disabled, is not included, as this working condition is usually not required for SR lighting drivers.

Figure 5:
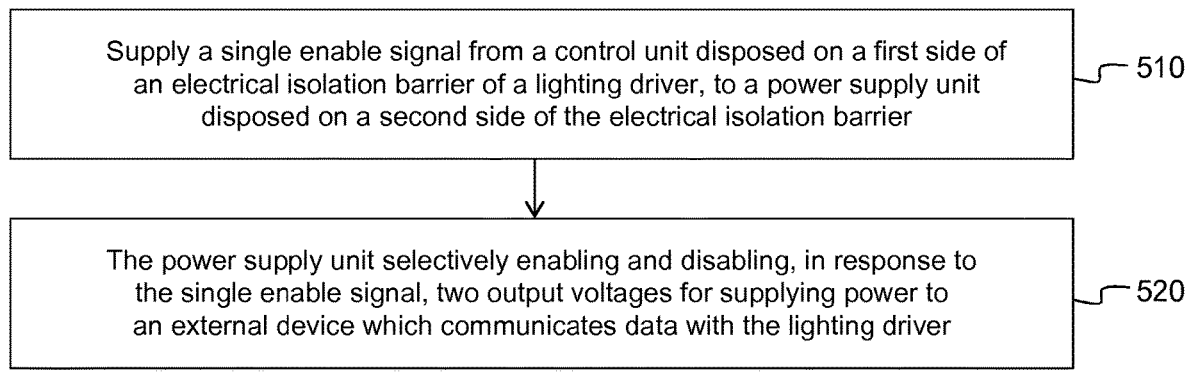
FIG. 5 shows a flowchart of a method of enabling and disabling power supplied from a "secondary side" of a sensor-ready LED lighting driver to an external device in response to enable and disable commands generated on the "primary side" of the lighting driver.

FIG. 5 shows a flowchart of a method 500 as described above for enabling and disabling power supplied from a "secondary side" of a sensor-ready LED lighting driver to an external device in response to enable and disable commands generated on the "primary side" of the lighting driver.

In a first operation 510, a control unit disposed on a first side of an electrical isolation barrier of a lighting driver supplies a single enable signal to a power supply unit disposed on a second side of the electrical isolation barrier.

In a second operation 520, in response to the single enable signal the power supply unit selectively enables and disables two output voltages for supplying power to an external device which communicates data with the lighting driver.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of" when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A lighting driver for driving at least one lighting device, the lighting driver comprising:
   a control unit disposed on a first side of an electrical isolation barrier;
   a transformer for supplying power to the at least one lighting device and comprising an auxiliary winding for supplying power to a second side of the electrical isolation barrier, the auxiliary winding being separated from the supplying of the at least one lighting device;
   a power supply unit disposed on the second side of the electrical isolation barrier so as to be electrically isolated from the control unit, the control unit supplying a single enable signal across the electrical isolation barrier to the power supply unit, wherein the power supply unit includes a switching circuit (S1/S2) configured to selectively enable and disable, in response to the single enable signal, two output voltages for supplying power to an external device which communicates data with the lighting driver;
   wherein the control unit is configured to supply the single enable signal having a selected one of at least three states, wherein the power supply unit is configured to switch the two output voltages such that one, both, or none of the two output voltages is supplied to the external device depending on the selected one of the at least three states, and
   wherein the at least three states of the single enable signal include a steady high voltage level, a steady low voltage level, and a pulse-width-modulated (PWM) signal, and wherein the power supply unit is configured to switch the two output voltages such that one, none, or both of the two output voltages are supplied to the external device depending on whether the single enable signal has the steady low voltage level, has the steady high voltage level, or is the PWM signal.

2. The lighting driver of claim 1, wherein the first output voltage is an auxiliary voltage, wherein the second output voltage is a Digital Addressable Lighting Interface (DALI) supply voltage, which is less than the auxiliary voltage, for a DALI bus, wherein the power supply unit includes a DALI supply voltage circuit which is configured to produce and regulate the DALI supply voltage from the auxiliary voltage, and wherein the lighting driver includes a DALI interface for communicating with the external device via the DALI bus.

3. The lighting driver of claim 2, wherein a return connection for the auxiliary voltage and a negative terminal side of the DALI supply voltage share a common line connected to the external device, and wherein the power supply unit further includes a high side current limiter connected to a positive terminal of the DALI supply voltage and which is configured to limit a current drawn by the DALI bus from the DALI supply voltage.

4. The lighting driver of claim 3, wherein the switching circuit (S1/S2) includes a first switch (S1) and a second switch (S2), wherein the first switch is connected between the auxiliary voltage and the positive voltage side of the DALI bus, wherein the second switch is connected in series with the common line connected to the external device, and wherein the power supply unit further comprises:
  a filter configured to supply a control signal to a control terminal of the second switch (S2) in response to the single select signal to turn on the second switch (S2 and supply the auxiliary voltage to the external device when the single enable signal to turn on the second has the steady low voltage level and when the single enable signal is the PWM signal, and to turn off the second switch and disable supply of the auxiliary voltage and the DALI supply voltage to the external device when the single enable signal has the steady high voltage level;
  a detector configured to detect whether the single enable signal is the PWM signal; and
  a voltage doubler which doubles a peak voltage of the PWM signal and supplies the doubled peak voltage to a control terminal of the first switch (S1)) to turn on the first switch and supply the DALI supply voltage to the external device when the single enable signal is the PWM signal, and to turn off the first switch and disable supply of the DALI supply voltage to the external device when the single enable signal has the steady low voltage level.

5. The lighting driver of claim 2, wherein the external device is an outdoor lighting controller which communicates wirelessly with a lighting network, wherein the lighting driver is configured to supply the auxiliary voltage and the DALI supply voltage to the outdoor lighting controller to power the outdoor lighting controller, and wherein the lighting driver is configured to communicate the data with the outdoor lighting controller over the DALI bus via the DALI interface.

6. A method for powering an external device with a lighting driver, the powering of the external device being separated from a power supply of a lighting device, the method comprising:
  supplying a single enable signal and an auxiliary power supply from a control unit disposed on a first side of an electrical isolation barrier of the lighting driver, to a power supply unit disposed on a second side of the electrical isolation barrier so as to be electrically isolated from the control unit;
  the power supply unit selectively enabling and disabling, in response to the single enable signal and to the auxiliary power supply, two output voltages for supplying power to the external device which communicates data with the lighting driver;

wherein the control unit selecting one of at least three states, and supplying the single enable signal having the selected state and switching the two output voltages such that one, both, or none of the two output voltages is supplied to the external device depending on the selected state, and
wherein the at least three states of the single enable signal include a steady high voltage level, a steady low voltage level, and a pulse-width-modulated (PWM) signal, the method further comprising switching the two output voltages such that one, none, or both of the two output voltages are supplied to the external device depending on whether the single enable signal has the steady low voltage level, has the steady high voltage level, or is the PWM signal.

7. The method of claim 6, wherein the first output voltage is an auxiliary voltage, wherein the second output voltage is a Digital Addressable Lighting Interface (DALI) voltage, which is less than the auxiliary voltage, for a DALI bus, the method further comprising:
  producing and regulating the DALI supply voltage from the auxiliary voltage; and
  communicating with the external device via the DALI bus.

8. The method of claim 7, further comprising:
  a return connection for the auxiliary voltage and a negative terminal of the DALI supply voltage sharing a common line connected to the external device; and
  limiting a current drawn by the DALI bus from the DALI supply voltage by a high side current limiter connected to a positive terminal of the DALI supply voltage.

9. The method of claim 8, further comprising:
  supplying the auxiliary voltage to the external device when the single enable signal has the steady low voltage level and when the single enable signal is the PWM signal;
  disabling supply of the auxiliary voltage and the DALI supply voltage to the external device when the single enable signal has the steady low voltage level;
  supplying the DALI supply voltage to the external device when the single enable signal is the PWM signal; and
  disabling supply of the DALI supply voltage to the external device when the single enable signal has the steady low voltage level.

10. The method of claim 7, wherein the external device is an outdoor lighting controller which communicates wirelessly with a lighting network, the method including:
  supplying the auxiliary voltage and the DALI supply voltage to the outdoor lighting controller to power the outdoor lighting controller; and
  the lighting driver communicating the data with the outdoor lighting controller via a DALI interface.

11. The method of claim 6, further comprising:
  disabling supply of both of the two output voltages to the external device in response to the single enable signal having a first of the at least three states;
  enabling a first one of the two output voltages to be supplied to the external device and disabling a second one of the two output voltages inhibiting supply of the second one of the two output voltages to the external device in response to the single enable signal having a second of the at least three states; and
  enabling both of the two output voltages to be supplied to the external device in response to the single enable signal having a third of the at least three states.

* * * * *